United States Patent
Ananthapur Bache et al.

(10) Patent No.: US 10,904,575 B2
(45) Date of Patent: *Jan. 26, 2021

(54) COMPRESSING MULTIPLE VIDEO FILES USING LOCALIZED CAMERA META DATA

(71) Applicant: INTERNATIONAL BUSINESS MACHINES CORPORATION, Armonk, NY (US)

(72) Inventors: Vijay Kumar Ananthapur Bache, Bangalore (IN); Vijay Ekambaram, Chennai (IN); Sarbajit K. Rakshit, Kolkata (IN); Saravanan Sadacharam, Chennai (IN)

(73) Assignee: International Business Machines Corporation, Armonk, NY (US)

(*) Notice: Subject to any disclaimer, the term of this patent is extended or adjusted under 35 U.S.C. 154(b) by 31 days.

This patent is subject to a terminal disclaimer.

(21) Appl. No.: 16/369,268

(22) Filed: Mar. 29, 2019

(65) Prior Publication Data
US 2019/0230381 A1    Jul. 25, 2019

Related U.S. Application Data

(63) Continuation of application No. 15/648,595, filed on Jul. 13, 2017, now Pat. No. 10,321,160.

(51) Int. Cl.
*H04N 19/70* (2014.01)
*H04N 19/172* (2014.01)
(Continued)

(52) U.S. Cl.
CPC ......... *H04N 19/70* (2014.11); *H04N 1/32128* (2013.01); *H04N 5/232* (2013.01);
(Continued)

(58) Field of Classification Search
CPC .... H04N 19/70; H04N 19/146; H04N 19/172; H04N 19/177; H04N 19/186
See application file for complete search history.

(56) References Cited

U.S. PATENT DOCUMENTS

| 8,736,701 B2 | 5/2014 | Marman et al. |
| 2004/0036780 A1* | 2/2004 | Toba .................... G06F 3/0613 348/231.2 |

(Continued)

FOREIGN PATENT DOCUMENTS

| WO | 2013056311 | 4/2013 |
| WO | 2016114788 | 7/2016 |

OTHER PUBLICATIONS

Al-Ani, MuzhirShaban et al; Video Compression Algorithm Based on Frame Difference Approaches; International Journal on Soft Computing (IJSC), vol. 2, No. 4; Nov. 2011; pp. 67-79.

(Continued)

*Primary Examiner* — Joseph Suh
(74) *Attorney, Agent, or Firm* — Schmeiser, Olsen & Watts; Nicholas L. Cadmus

(57) ABSTRACT

An approach is provided for compressing video frames captured by a camera. Clusters of the video frames are determined, where the clusters have correlations to respective sets of values of meta data associated with the video frames. The meta data includes a location, focal length, and direction of the camera, and a time of day during a capture of the video frames by the camera. Based on multiple video frames within each of the clusters being compared with each other but not being compared with a video frame in another cluster, base and delta frames are determined and stored for each of the clusters. An amount of storage required for the base and delta frames is based in part on each of the correlations to the respective sets of values of the meta data.

19 Claims, 3 Drawing Sheets

(51) Int. Cl.
*H04N 19/177* (2014.01)
*H04N 19/186* (2014.01)
*H04N 19/146* (2014.01)
*H04N 19/114* (2014.01)
*H04N 19/136* (2014.01)
*H04N 1/32* (2006.01)
*H04N 5/232* (2006.01)

(52) U.S. Cl.
CPC ......... *H04N 19/114* (2014.11); *H04N 19/136* (2014.11); *H04N 19/146* (2014.11); *H04N 19/172* (2014.11); *H04N 19/177* (2014.11); *H04N 19/186* (2014.11)

(56) References Cited

U.S. PATENT DOCUMENTS

| | | | | |
|---|---|---|---|---|
| 2006/0187317 | A1* | 8/2006 | Montulli | H04N 5/2251 348/231.5 |
| 2009/0228799 | A1* | 9/2009 | Verbeeck | G06F 16/638 715/727 |
| 2017/0208350 | A1* | 7/2017 | Herrick | H04N 19/42 |
| 2017/0212028 | A1* | 7/2017 | Correia De Matos Nolasco Lamas | G06K 9/00134 |
| 2017/0263201 | A1* | 9/2017 | Sato | G09G 3/3648 |
| 2018/0075592 | A1* | 3/2018 | White | G06T 7/85 |
| 2018/0157904 | A1* | 6/2018 | Girish | G06K 9/6267 |
| 2018/0189143 | A1* | 7/2018 | Ananthapur Bache | H04N 19/179 |
| 2019/0020901 | A1 | 1/2019 | Ananthapur Bache | |

OTHER PUBLICATIONS

Alantalkstech—Youtube; MPEG Compression & how it works in IPTV and other digital media delivery systems; URL: https://www.youtube.com/watch?v=P7abyWT4dss; retrieved from the Internet Feb. 1, 2017; 5 pages.

Bai, Xue et al.; Dynamic Color Flow: A Motion-Adaptive Color Model for Object Segmentation in Video; 11th European Conference on Computer Vision: Part V; Sep. 5-11, 2010; pp. 617-630.

Girod, Bernd et al.; Multi-frame motion-compensated video compression for the digital set-top box; 2002 International Conference on Image Processing; Sep. 22-25, 2002; 4 pages.

Guanghua, Chen et al.; VLSI Implementation of Sub-pixel Interpolator for AVS Encoder; 2010 International Conference on Life System Modeling and Simulation and Intelligent Computing and 2010 International conference on Intelligent computing for sustainable Energy and Environment: Part II; Sep. 17-20, 2010; pp. 351-359.

Video Compression; Final Cut Pro 7 User Manual; URL: https:/documentation.apple.com/en/finalcutpro/usermanual/index.html#. . . ; retrieved from the Internet Feb. 2, 2017; 3 pages.

Wikipedia: Field of view; URL: https://en.wikipedia.org/wiki/Field_of_view; retrieved from the Internet Feb. 1, 2017; 2 pages.

Syta, James M.; List of IBM Patents or Patent Applications Treated as Related; Mar. 29, 2019; 1 page.

* cited by examiner

COMPRESSING MULTIPLE VIDEO FILES USING LOCALIZED CAMERA META DATA

CROSS REFERENCE TO RELATED APPLICATIONS

This application is a continuation application claiming priority to Ser. No. 15/648,595 filed Jul. 13, 2017, now U.S. Pat. No. 10,321,160 issued Jun. 11, 2019, the contents of which are hereby incorporated by reference.

BACKGROUND

The present invention relates to image processing, and more particularly to compressing video files.

Known video compression techniques include intraframe (i.e., spatial) compression and interframe (i.e., temporal) compression that are applied within individual video files. An intraframe compression technique compresses individual frames by coding areas of similar color and texture with fewer bits than the original image. An interframe compression technique compresses a sequence of frames together by eliminating redundant visual data across multiple frames and storing only what has changed from one frame to the next. Three types of compressed frames are used in known video compression of groups of pictures: (1) I-frames (i.e., key frames or base frames; also known as intra-coded pictures), (2) P-frames (i.e., predicted frames), and (3) B-frames (i.e., bi-directional frames). I-frames include all the necessary data to re-create a complete image. An I-frame stands by itself, without requiring data from other frames in the group. An I-frame is, in effect, a fully specified picture like a conventional static image file. P-frames include only the changes in the image from the previous frame. For example, in a scene in which a car moves across a stationary background, only the car's movements need to be encoded in a P-frame. The encoder does not need to store the unchanging background pixels in the P-frame, thereby saving space. P-frames are also known as delta frames. Each B-frame is encoded based on differences between the B-frame and both the preceding and the following frames. P-frames and B-frames hold only part of the image information, so they need less space to store than an I-frame and thus improve video compression rates.

In known video compression algorithms, the time to compress/decompress and compression efficiency are conflicting parameters. Known video compression algorithms that have higher compression efficiencies than other algorithms also take more time to compress/decompress. Furthermore, video compression algorithms that have lower compression efficiencies than other algorithms take less time to compress/decompress.

SUMMARY

In one embodiment, the present invention provides a method of compressing video frames captured by a camera. The method includes a computer determining a location of the camera during a capture of the video frames by the camera, a focal length of the camera during the capture of the video frames, a direction of the camera during the capture of the video frames, and a time of day during the capture of the video frames. The method further includes the computer associating meta data with the video frames captured by the camera. The meta data includes the location of the camera, the focal length of the camera, the direction of the camera, and the time of day. The method further includes the computer determining clusters of the video frames having correlations to respective sets of values of the meta data. Each of the correlations exceeds a predetermined threshold value. The method further includes based on a color space, a resolution, a frame rate, a refresh rate, and a bit rate of video files that include multiple video frames within each of the clusters, and based on an analysis of color balance and color intensity and an analysis of texture of each of the multiple video frames within each of the clusters, the computer comparing the multiple video frames within each of the clusters without comparing the multiple video frames with a video frame in another cluster. The method further includes based on the multiple video frames within each of the clusters being compared with each other but not being compared with the video frame in another cluster, the computer determining a base frame and delta frames for each of the clusters, and storing the base frame and delta frames for each of the clusters. An amount of storage required for the base frame and delta frames for each of the clusters is based in part on each of the correlations to the respective sets of values of the meta data exceeding the predetermined threshold value.

In another embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of compressing video frames captured by a camera. The method includes the computer system determining a location of the camera during a capture of the video frames by the camera, a focal length of the camera during the capture of the video frames, a direction of the camera during the capture of the video frames, and a time of day during the capture of the video frames. The method further includes the computer system associating meta data with the video frames captured by the camera. The meta data includes the location of the camera, the focal length of the camera, the direction of the camera, and the time of day. The method further includes the computer system determining clusters of the video frames having correlations to respective sets of values of the meta data. Each of the correlations exceeds a predetermined threshold value. The method further includes based on a color space, a resolution, a frame rate, a refresh rate, and a bit rate of video files that include multiple video frames within each of the clusters, and based on an analysis of color balance and color intensity and an analysis of texture of each of the multiple video frames within each of the clusters, the computer system comparing the multiple video frames within each of the clusters without comparing the multiple video frames with a video frame in another cluster. The method further includes based on the multiple video frames within each of the clusters being compared with each other but not being compared with the video frame in another cluster, the computer system determining a base frame and delta frames for each of the clusters, and storing the base frame and delta frames for each of the clusters. An amount of storage required for the base frame and delta frames for each of the clusters is based in part on each of the correlations to the respective sets of values of the meta data exceeding the predetermined threshold value.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of compressing video frames captured by a camera. The method includes the computer system determining a location of the camera during a capture of the video frames by the camera, a focal length of the camera during the capture of the video frames, a direction of the camera during the capture of the video frames, and a time of day during the capture of the video frames. The method further includes the computer system associating meta data with the video frames captured by the camera. The meta data includes the location of the camera, the focal length of the camera, the direction of the camera, and the time of day. The method further includes the computer system determining clusters of the video frames having correlations to respective sets of values of the meta data. Each of the correlations exceeds a predetermined threshold value. The method further includes based on a color space, a resolution, a frame rate, a refresh rate, and a bit rate of video files that include multiple video frames within each of the clusters, and based on an analysis of color balance and color intensity and an analysis of texture of each of the multiple video frames within each of the clusters, the computer system comparing the multiple video frames within each of the clusters without comparing the multiple video frames with a video frame in another cluster. The method further includes based on the multiple video frames within each of the clusters being compared with each other but not being compared with the video frame in another cluster, the computer system determining a base frame and delta frames for each of the clusters, and storing the base frame and delta frames for each of the clusters. An amount of storage required for the base frame and delta frames for each of the clusters is based in part on each of the correlations to the respective sets of values of the meta data exceeding the predetermined threshold value.

Embodiments of the present invention provide fast video compression across multiple video files stored in local space for backup archiving without compromising video compression efficiency.

DETAILED DESCRIPTION

Overview

Although known video compression techniques generally perform the compression within individual video files, there are common scenarios in which compression of video frames across multiple video files stored in local space is desirable. For example, video surveillance files may have background similarities across the files, so that compression across the files may lead to better compression efficiency. As another example, television programs may be recorded using the same shooting sets, so that compression across video files of the television programs may result in improved compression efficiency.

A trivial approach to enabling video compression across multiple video files stored in local space for backup archiving includes: (1) performing video visual analysis on multiple video files and extracting visual-related data for all the frames in the video files; and (2) based on the extracted visual-related data for the frames, comparing all frames across each other to determine which frames to correlate and combine across the multiple video files to obtain delta frames for a better comparison. The trivial approach disadvantageously takes a long time to complete archiving because all video files in the local space must be processed and visual data at each frame must be extracted and compared across all other frames of multiple video files. Thus, the aforementioned trivial approach requires a significant amount of time to enable complete compression. Because of this time-related disadvantage, current video compression techniques are not applied across multiple video files.

Embodiments of the present invention avoid the disadvantages of the aforementioned trivial approach by providing fast video compression across multiple video files stored in local space for backup archiving without compromising compression efficiency. Embodiments of the present invention capture localized camera field-of-view information as video frames are recorded by a camera, associate the captured information as meta data with the recorded video frames, determine similarity in visual properties between video frames based on the meta data, determine clusters of the video frames based on the meta data, and apply known video frame compression to each of the clusters.

System for Compressing Video Frames Captured by a Camera

Figure 1:
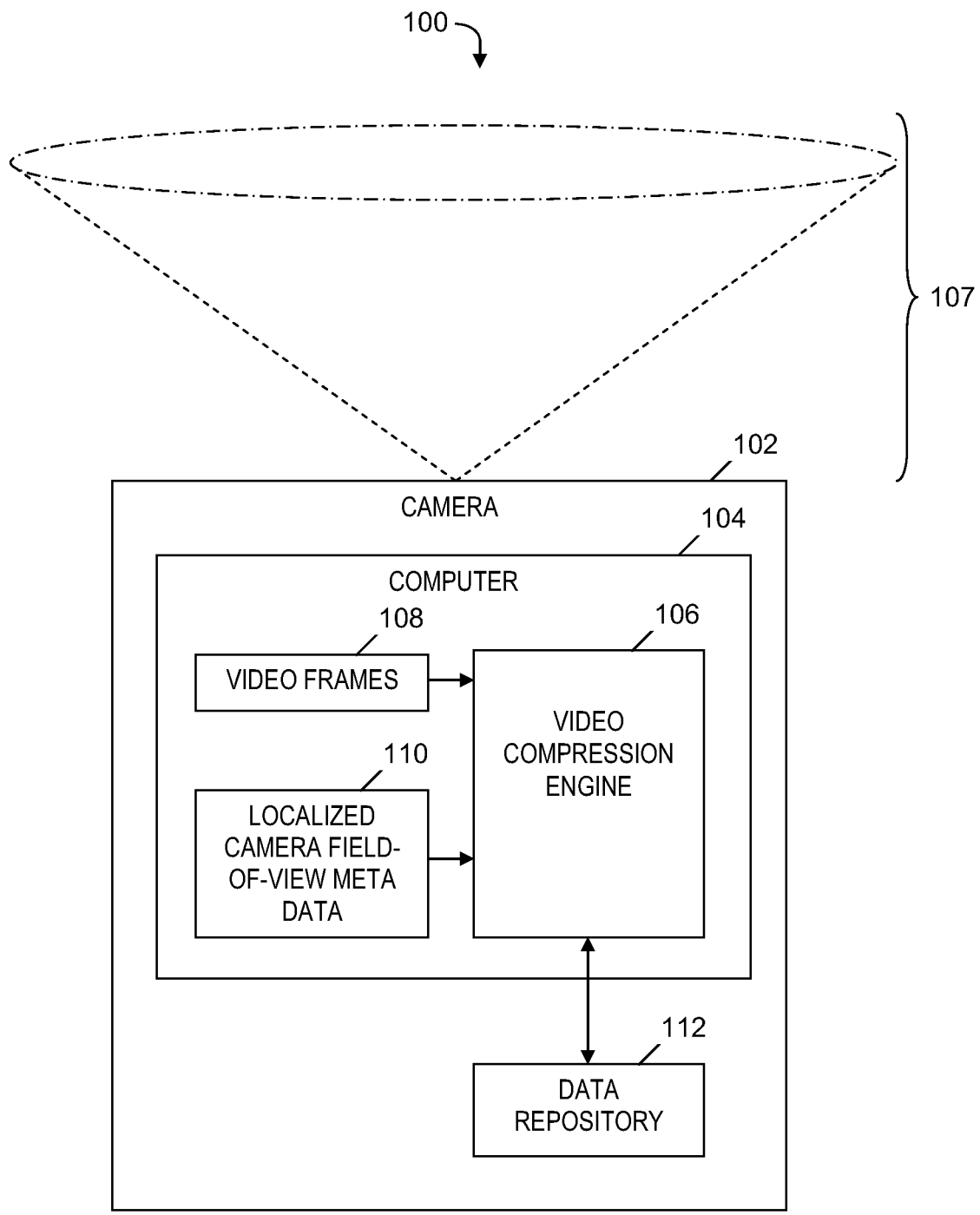
FIG. 1 is a block diagram of a system for compressing video frames captured by a camera, in accordance with embodiments of the present invention.

FIG. 1 is a block diagram of a system 100 for compressing video frames captured by a camera, in accordance with embodiments of the present invention. System 100 includes a camera 102 that captures or records video, and which includes a computer 104. Computer 104 executes a software-based video compression engine 106. Camera 102 captures video that includes objects in a field-of-view 107, which is the part of the physical world that is visible through camera 102 at a particular position and orientation in space. Objects outside of the field-of-view 107 are not recorded by camera 102.

Video compression engine 106 receives and processes video frames 108 (i.e., the video frames that compose the video captured by camera 102) which were captured by camera 102 and stored in respective video files. Furthermore, video compression engine 106 receives or determines localized camera field-of-view meta data 110. Video compression engine 106 stores in a data repository 112 the localized camera field-of-view meta data 110 in association with respective video frames 108 (i.e., meta data 110 is associated with each of the video frames 108 recorded by camera 102).

In one embodiment, localized camera field-of-view meta data 110 associated with a particular video frame included in video frames 108 includes values indicating (i) the time (i.e., a timestamp indicating the time of day) at which the video frame was captured by camera 102; (ii) the geographic location of camera 102 at the time at which the video frame was captured by camera 102; (iii) a focal length of camera 102 at the time at which the video frame was captured by camera 102; and (iv) a direction of camera 102 (i.e., a direction in which a light-capturing component (e.g., lens) of camera 102 is pointed) at the time at which the video frame was captured by camera 102.

During backup archiving of the video files that include video frames 108, video compression engine 106 clusters video frames 108 based on the localized camera field-of-view meta data 110. In comparisons of video frames within each of the clusters, video compression engine 106 utilizes known visual meta data comparison technique(s) to derive base and delta frames which are used to compress video frames 108.

Figure 2:
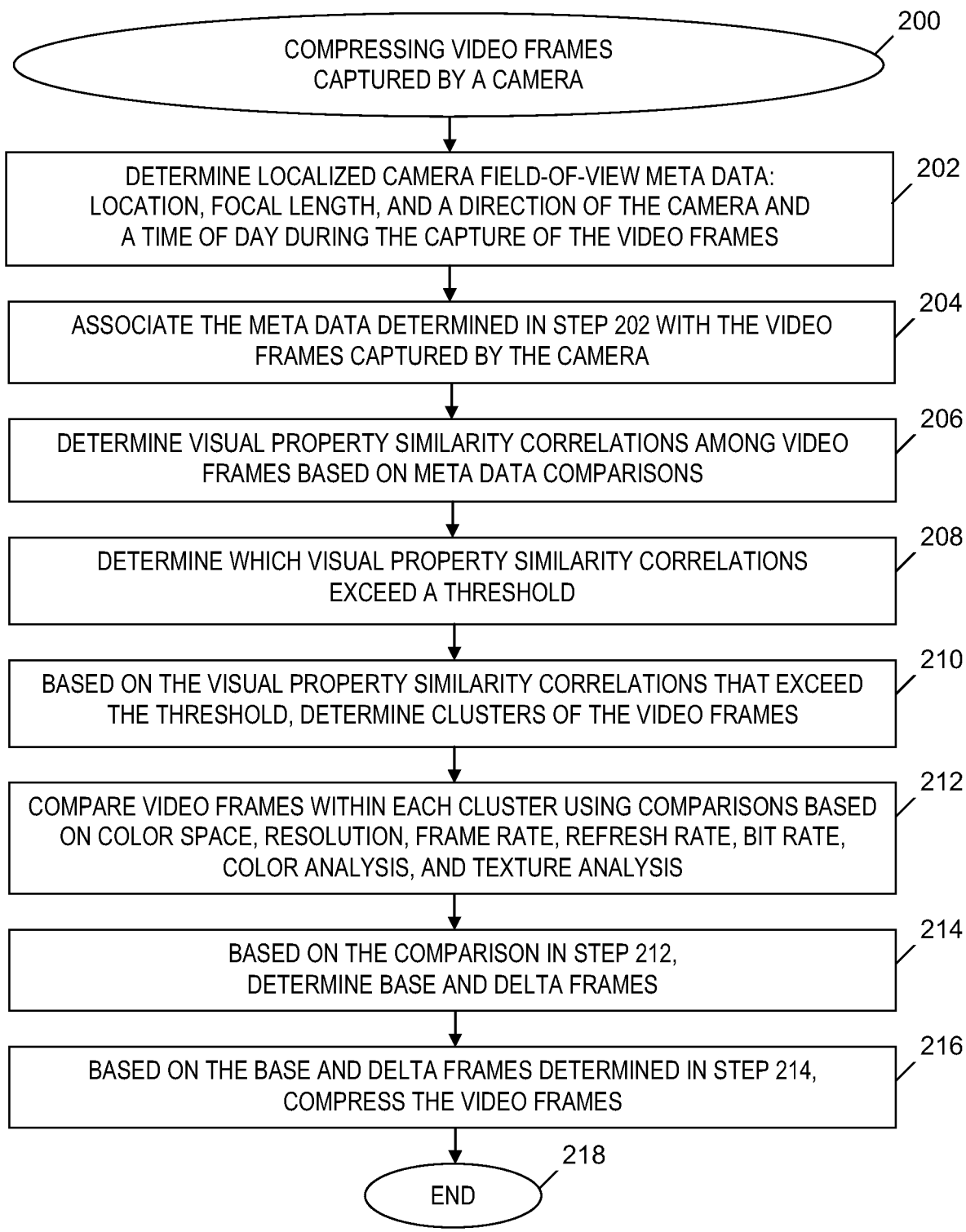
FIG. 2 is a flowchart of a process of compressing video frames captured by a camera, in accordance with embodiments of the present invention.
Figure 3:
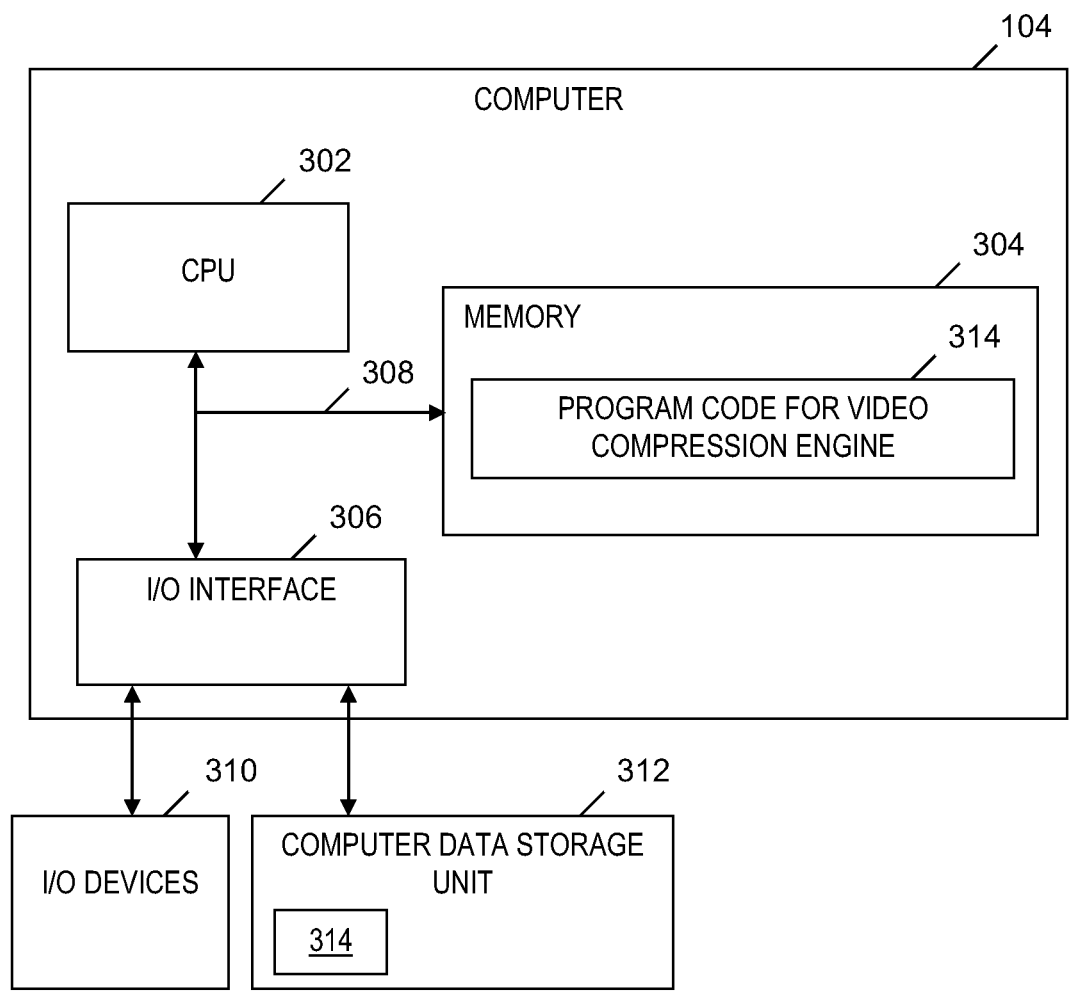
FIG. 3 is a block diagram of a computer included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for Compressing Video Frames Captured by a Camera

FIG. 2 is a flowchart of a process of compressing video frames captured by a camera, in accordance with embodiments of the present invention. The process of FIG. 2 starts at step 200. In step 202, video compression engine 106 (see FIG. 1) receives information included in a localized camera field-of-view 107 (see FIG. 1) of camera 102 (see FIG. 1). Also in step 202, video compression engine 106 (see FIG. 1) determines localized camera field-of-view meta data 110 (see FIG. 1) based on the aforementioned received information. In one embodiment, meta data 110 (see FIG. 1) includes sets of values, each set corresponding to a respective video frame included in video frames 108 (see FIG. 1). In one embodiment, each set of values in meta data 110 (see FIG. 1) includes values indicating (i) a time at which the video frame corresponding to the set of values in meta data 110 (see FIG. 1) (hereinafter also referred to as "the corresponding video frame") was captured by camera 102 (see FIG. 1); (ii) a geographic location of camera 102 (see FIG. 1) at the time at which the corresponding video frame was captured by camera 102 (see FIG. 1); (iii) a focal length of camera 102 (see FIG. 1) at the time during which the corresponding video frame was captured by camera 102 (see FIG. 1); and (iv) a direction of camera 102 (see FIG. 1) at the time during which the corresponding video frame was captured by camera 102 (see FIG. 1).

In step 204, video compression engine 106 (see FIG. 1) associates the sets of values included in the meta data 110 (see FIG. 1) determined in step 202 with respective video frames 108 (see FIG. 1). Also in step 204, video compression engine 106 (see FIG. 1) stores in data repository 112 (see FIG. 1) meta data 110 (see FIG. 1), video frames 108 (see FIG. 1), and the associations between meta data 110 (see FIG. 1) and video frames 108 (see FIG. 1).

In step 206, video compression engine 106 (see FIG. 1) determines visual property similarity correlations among video frames 108 (see FIG. 1) by comparing sets of values included in meta data 110 (see FIG. 1) across corresponding video frames 108 (see FIG. 1). Based on the compared sets of values included in meta data 110 (see FIG. 1), video compression engine 106 (see FIG. 1) determines a measure of correlation (i.e., visual property similarity correlation) between pairs of the video frames 108 (see FIG. 1). The measure of the aforementioned correlation between two video frames included in video frames 108 (see FIG. 1) is an indicator of the visual similarity between the two video frames. A greater measure of correlation of the values of meta data 110 (see FIG. 1) between the two video frames indicates a greater likelihood that the two video frames share similar visual properties or share identical visual properties.

For example, in a video surveillance camera, all video frames that are captured by the camera in location "X," where the camera had focal length "Y" and pointed in direction "Z" include the same field-of-view. Thus, the video frames sharing identical "X," "Y," and "Z" values of meta data 110 (see FIG. 1) indicates a high likelihood that the video frames share similar or identical visual properties.

In step 208, video compression engine 106 (see FIG. 1) determines which visual property similarity correlations determined in step 206 exceed a predetermined threshold correlation, where the predetermined threshold correlation was received by video compression engine 106 (see FIG. 1) prior to step 208.

In step 210, based on the visual property similarity correlations that exceed the threshold correlation, video compression engine 106 (see FIG. 1) determines clusters of video frames 108 (see FIG. 1) across multiple video files. Thus, each cluster includes a corresponding group of video frames included in video frames 108 (see FIG. 1), where the video frames in one cluster are more visually similar to each other in terms of the meta data 110 (see FIG. 1) than to video frames in other clusters. Moreover, at least one of the clusters determined in step 210 includes one video frame included in a first video file and another video frame included in a second video file, where the first and second video files are different files. In an alternate embodiment, software installed in the local system performs step 210 during backup archiving of the video files that include video frames 108 (see FIG. 1).

In one embodiment, step 210 may include, in part, performing a data clustering method such as hierarchical clustering that uses an agglomerative or a divisive approach.

In step 212, video compression engine 106 (see FIG. 1) compares video frames within each of the clusters determined in step 210 based on fixed physical characteristics of the video files that include the respective video frames and/or based on color and texture analyses performed on the individual video frames. In one embodiment, prior to step 212, video compression engine 106 (see FIG. 1) (i) receives or determines a color space, a resolution, a frame rate, a refresh rate, and a bit rate of each of one or more video files, where the one or more video files include the video frames within each of the aforementioned clusters, and (ii) performs an analysis of color balance and color intensity and an analysis of texture of each of the video frames within each of the clusters. In one embodiment, the comparison in step 212 is performed based on the color space, resolution, frame rate, refresh rate, bit rate, analysis of color balance and color intensity, and analysis of the texture. The comparison is performed in step 212 without comparing the video frames within any one of the clusters with any video frame included in another cluster.

The color space of a video file is a mathematically structured organization of colors based on a color model such as an RGB color space based on the RGB color model. The resolution is an image resolution that indicates the detail that an image in a video frame holds, and may be expressed as a number of pixel columns by a number of pixel rows (e.g., 1280×720).

In one embodiment, video compression engine 106 (see FIG. 1) may determine the aforementioned color space, resolution, frame rate, refresh rate, and bit rate via a direct inspection of the video files using known means.

In step 214, based on the comparison in step 212 and without comparing the video frames within any one cluster with any video frame included in another cluster, video compression engine 106 (see FIG. 1) determines I-frames (i.e., base frames) for respective clusters determined in step 210 and determines delta frames for respective video frames included in each respective cluster. In the determination of an I-frame and the delta frames, video compression engine 106 (see FIG. 1) uses known techniques of visual meta data comparison across video frames, which may analyze color space, resolution(s), frame rate(s), refresh rate(s), and/or bit rate(s), and may use color (i.e., RGB) analysis, and/or texture analysis (e.g., sky, curtain, etc.).

In step 216, based on the I-frames and delta frames determined in step 214, video compression engine 106 (see FIG. 1) compresses video frames 108 (see FIG. 1).

Since clustering in step 210 is done based on localized camera field-of-view meta data 110 (see FIG. 1), which indicates greater likelihood of similarities in visual properties of the video frames in each cluster, the storage size required for delta frames determined in step 214 is significantly less as compared to the storage size required for the original video frames, thereby increasing compression efficiency. Moreover, only video frames in a particular cluster determined in step 210 are compared across each other in step 212 to determine the delta frames in step 214, thereby resulting in fast archiving.

Computer System

FIG. 3 is a block diagram of a computer included in the system of FIG. 1 and that implements the process of FIG. 2, in accordance with embodiments of the present invention. Computer 104 is a computer system that generally includes a central processing unit (CPU) 302, a memory 304, an input/output (I/O) interface 306, and a bus 308. Further, computer 104 is coupled to I/O devices 310 and a computer data storage unit 312. CPU 302 performs computation and control functions of computer 104, including executing instructions included in program code 314 for video compression engine 106 (see FIG. 1) to perform a method of compressing video frames 108 (see FIG. 1) captured by camera 102 (see FIG. 1), where the instructions are executed by CPU 302 via memory 304. CPU 302 may include a single processing unit, or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 104, and may include any type of transmission link, including electrical, optical, wireless, etc.

I/O interface 306 also allows computer 104 to store information (e.g., data or program instructions such as program code 314) on and retrieve the information from computer data storage unit 312 or another computer data storage unit (not shown). Computer data storage unit 312 includes a known computer-readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are executed by CPU 302 via memory 304 to compress video frames 108 (see FIG. 1) captured by camera 102 (see FIG. 1). Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

Storage unit 312 and/or one or more other computer data storage units (not shown) that are coupled to computer 104 may store video frames 108 (see FIG. 1) and localized camera field-of-view meta data 110 (see FIG. 1) and associations therebetween.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to compressing video frames 108 (see FIG. 1) captured by camera 102 (see FIG. 1). Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 104) including one or more processors (e.g., CPU 302), wherein the processor(s) carry out instructions contained in the code causing the computer system to compress video frames 108 (see FIG. 1) captured by camera 102 (see FIG. 1). Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of compressing video frames 108 (see FIG. 1) captured by camera 102 (see FIG. 1).

While it is understood that program code 314 for compressing video frames 108 (see FIG. 1) captured by camera 102 (see FIG. 1) may be deployed by manually loading directly in client, server and proxy computers (not shown) via loading a computer-readable storage medium (e.g., computer data storage unit 312), program code 314 may also be automatically or semi-automatically deployed into computer 104 by sending program code 314 to a central server or a group of central servers. Program code 314 is then downloaded into client computers (e.g., computer 104) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of compressing video frames 108 (see FIG. 1) captured by camera 102 (see FIG. 1). In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 104). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 104) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 104) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 104), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of compressing video frames captured by a camera, the method comprising:
   determining, by one or more processors, clusters of the video frames having correlations to respective sets of values of meta data, each of the correlations exceeding a predetermined threshold value, the meta data being associated with the video frames, and the meta data including a location of the camera during a capture of the video frames by the camera, a focal length of the camera during the capture of the video frames, a direction of the camera during the capture of the video frames, and a time of day during the capture of the video frames;
   based on a color space, a resolution, a frame rate, a refresh rate, and a bit rate of video files that include multiple video frames within each of the clusters, and based on an analysis of color balance and color intensity and an analysis of a texture of each of the multiple video frames within each of the clusters, comparing, by the one or more processors, the multiple video frames within each of the clusters without comparing the multiple video frames with a video frame in another cluster; and
   based on the multiple video frames within each of the clusters being compared with each other but not being compared with the video frame in another cluster, determining, by the one or more processors, a base frame and delta frames for each of the clusters, and storing the base frame and delta frames for each of the clusters, an amount of storage required for the base frame and delta frames for each of the clusters being based in part on each of the correlations to the respective sets of values of the meta data exceeding the predetermined threshold value.

2. The method of claim 1, further comprising based on the base and delta frames, which were determined based on the multiple video frames within each of the clusters being compared with each other, compressing, by the one or more processors, the video frames captured by the camera.

3. The method of claim 2, wherein the compressing the video frames includes compressing the video frames across multiple video files.

4. The method of claim 1, further comprising:
   determining, by the one or more processors, times at which video frames included in a group of video frames were captured by the camera; and
   determining, by the one or more processors, a set of meta data associated with each of the video frames in the group, the set of meta data including a first value indicating a location of the camera at each of the times, a second value indicating a focal length of the camera at each the times, and a third value indicating a direction of the camera at each of the times;
   based on each of the video frames in the group being associated with the first, second, and third values, determining, by the one or more processors, that the camera points to a same field-of-view at each of the times; and
   based on the camera pointing to the same field-of-view at each of the times, determining, by the one or more processors, that the video frames included in the group share a similarity in visual properties that exceeds a threshold measurement of similarity.

5. The method of claim 1, wherein the determining the clusters, comparing the multiple video frames, determining the base and delta frames, and storing the base and delta frames are performed during backup archiving of the video frames.

6. The method of claim 1, further comprising:
   determining, by the one or more processors, a correlation of a set of values of the meta data to a group of the video frames;
   based on the correlation, determining, by the one or more processors, a likelihood of the video frames in the group having similar visual properties;
   determining, by the one or more processors, that the likelihood of each of the video frames in the group exceeds a second predetermined threshold value; and
   based on the likelihood of the video frames in the group having similar visual properties exceeds the second predetermined threshold value, determining, by the one or more processors, one of the clusters of the video frames.

7. The method of claim 1, further comprising:
   providing at least one support service for at least one of creating, integrating, hosting, maintaining, and deploying computer readable program code in the computer, the program code being executed by a processor of the computer to implement the determining the clusters of the video frames, comparing the multiple video frames within each of the clusters, determining the base frame and the delta frames for each of the clusters, and storing the base frame and delta frames for each of the clusters.

8. A computer program product, comprising:
   a computer readable storage medium; and
   a computer readable program code stored in the computer readable storage medium, the computer readable program code containing instructions that are executed by a central processing unit (CPU) of a computer system to implement a method of compressing video frames captured by a camera, the method comprising:
   the computer system determining clusters of the video frames having correlations to respective sets of values of meta data, each of the correlations exceeding a predetermined threshold value, the meta data being associated with the video frames, and the meta data including a location of the camera during a capture of the video frames by the camera, a focal length of the camera during the capture of the video frames, a direction of the camera during the capture of the video frames, and a time of day during the capture of the video frames;

based on a color space, a resolution, a frame rate, a refresh rate, and a bit rate of video files that include multiple video frames within each of the clusters, and based on an analysis of color balance and color intensity and an analysis of a texture of each of the multiple video frames within each of the clusters, the computer system comparing the multiple video frames within each of the clusters without comparing the multiple video frames with a video frame in another cluster; and based on the multiple video frames within each of the clusters being compared with each other but not being compared with the video frame in another cluster, the computer system determining a base frame and delta frames for each of the clusters, and storing the base frame and delta frames for each of the clusters, an amount of storage required for the base frame and delta frames for each of the clusters being based in part on each of the correlations to the respective sets of values of the meta data exceeding the predetermined threshold value.

9. The computer program product of claim 8, wherein the method implemented by the instructions being executed by the CPU further comprises based on the base and delta frames, which were determined based on the multiple video frames within each of the clusters being compared with each other, the computer system compressing the video frames captured by the camera.

10. The computer program product of claim 9, wherein the compressing the video frames includes compressing the video frames across multiple video files.

11. The computer program product of claim 8, wherein the method implemented by the instructions being executed by the CPU further comprises:

the computer system determining times at which video frames included in a group of video frames were captured by the camera; and the computer system determining a set of meta data associated with each of the video frames in the group, the set of meta data including a first value indicating a location of the camera at each of the times, a second value indicating a focal length of the camera at each the times, and a third value indicating a direction of the camera at each of the times;

based on each of the video frames in the group being associated with the first, second, and third values, the computer system determining that the camera points to a same field-of-view at each of the times; and based on the camera pointing to the same field-of-view at each of the times, the computer system determining that the video frames included in the group share a similarity in visual properties that exceeds a threshold measurement of similarity.

12. The computer program product of claim 8, wherein the determining the clusters, comparing the multiple video frames, determining the base and delta frames, and storing the base and delta frames are performed during backup archiving of the video frames.

13. The computer program product of claim 8, wherein the method implemented by the instructions being executed by the CPU further comprises:

the computer system determining a correlation of a set of values of the meta data to a group of the video frames;

based on the correlation, the computer system determining a likelihood of the video frames in the group having similar visual properties;

the computer system determining that the likelihood of each of the video frames in the group exceeds a second predetermined threshold value; and based on the likelihood of the video frames in the group having similar visual properties exceeds the second predetermined threshold value, the computer system determining one of the clusters of the video frames.

14. A computer system comprising:
a central processing unit (CPU);
a memory coupled to the CPU; and
a computer readable storage device coupled to the CPU, the storage device containing instructions that are executed by the CPU via the memory to implement a method of compressing video frames captured by a camera, the method comprising:

the computer system determining clusters of the video frames having correlations to respective sets of values of meta data, each of the correlations exceeding a predetermined threshold value, the meta data being associated with the video frames, and the meta data including a location of the camera during a capture of the video frames by the camera, a focal length of the camera during the capture of the video frames, a direction of the camera during the capture of the video frames, and a time of day during the capture of the video frames;

based on a color space, a resolution, a frame rate, a refresh rate, and a bit rate of video files that include multiple video frames within each of the clusters, and based on an analysis of color balance and color intensity and an analysis of a texture of each of the multiple video frames within each of the clusters, the computer system comparing the multiple video frames within each of the clusters without comparing the multiple video frames with a video frame in another cluster; and based on the multiple video frames within each of the clusters being compared with each other but not being compared with the video frame in another cluster, the computer system determining a base frame and delta frames for each of the clusters, and storing the base frame and delta frames for each of the clusters, an amount of storage required for the base frame and delta frames for each of the clusters being based in part on each of the correlations to the respective sets of values of the meta data exceeding the predetermined threshold value.

15. The computer system of claim 14, wherein the method implemented by the instructions being executed by the CPU further comprises based on the base and delta frames, which were determined based on the multiple video frames within each of the clusters being compared with each other, the computer system compressing the video frames captured by the camera.

16. The computer system of claim 15, wherein the compressing the video frames includes compressing the video frames across multiple video files.

17. The computer system of claim 14, wherein the method implemented by the instructions being executed by the CPU further comprises:
- the computer system determining times at which video frames included in a group of video frames were captured by the camera; and
- the computer system determining a set of meta data associated with each of the video frames in the group, the set of meta data including a first value indicating a location of the camera at each of the times, a second value indicating a focal length of the camera at each the times, and a third value indicating a direction of the camera at each of the times;
- based on each of the video frames in the group being associated with the first, second, and third values, the computer system determining that the camera points to a same field-of-view at each of the times; and
- based on the camera pointing to the same field-of-view at each of the times, the computer system determining that the video frames included in the group share a similarity in visual properties that exceeds a threshold measurement of similarity.

18. The computer system of claim 14, wherein the determining the clusters, comparing the multiple video frames, determining the base and delta frames, and storing the base and delta frames are performed during backup archiving of the video frames.

19. The computer system of claim 14, wherein the method implemented by the instructions being executed by the CPU further comprises:
- the computer system determining a correlation of a set of values of the meta data to a group of the video frames;
- based on the correlation, the computer system determining a likelihood of the video frames in the group having similar visual properties;
- the computer system determining that the likelihood of each of the video frames in the group exceeds a second predetermined threshold value; and
- based on the likelihood of the video frames in the group having similar visual properties exceeds the second predetermined threshold value, the computer system determining one of the clusters of the video frames.

* * * * *